(12) United States Patent
Akkur Ramabhadraiah et al.

(10) Patent No.: US 12,272,835 B2
(45) Date of Patent: Apr. 8, 2025

(54) MOTOR VEHICLE BATTERY SUPPORT

(71) Applicant: Volvo Truck Corporation, Gothenburg (SE)

(72) Inventors: Shree Harsha Akkur Ramabhadraiah, Karnataka (IN); Rajendra Chamarajanagar Rajanna, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 307 days.

(21) Appl. No.: 17/894,340

(22) Filed: Aug. 24, 2022

(65) Prior Publication Data
US 2023/0068558 A1 Mar. 2, 2023

(30) Foreign Application Priority Data
Aug. 31, 2021 (EP) .................................... 21194163

(51) Int. Cl.
*H01M 50/264* (2021.01)
*B60R 16/033* (2006.01)
(Continued)

(52) U.S. Cl.
CPC ......... *H01M 50/264* (2021.01); *B60R 16/033* (2013.01); *B60R 25/01* (2013.01); *H01M 50/249* (2021.01); *H01M 2220/20* (2013.01)

(58) Field of Classification Search
CPC ............. H01M 50/264; H01M 50/249; H01M 2220/20; B60R 16/033; B60R 25/01; B60R 16/04; Y02E 60/10; B60K 1/04
See application file for complete search history.

(56) References Cited

U.S. PATENT DOCUMENTS 1,208,236 A * 12/1916 Thompson et al. ........................
E05B 73/0076
411/87
1,577,292 A * 3/1926 Obreiter .............. H01M 50/202
16/DIG. 15
(Continued)

FOREIGN PATENT DOCUMENTS

AT          521809 A1 *  5/2020
AU    2008200632 A1 *  8/2008
(Continued)

OTHER PUBLICATIONS

Translated AT-521809-A1 (Year: 2024).*
(Continued)

*Primary Examiner* — James A Shriver, II
*Assistant Examiner* — Ian Bryce Shelton
(74) *Attorney, Agent, or Firm* — Withrow & Terranova, PLLC

(57) ABSTRACT

A battery support for a motor vehicle comprising a tray for receiving at least one battery, a device for holding the battery or batteries on the tray, the holding device comprising a flange on a threaded rod, and a device for clamping the flange on the battery or batteries, wherein the clamping device comprises a sleeve slidably mounted on the threaded rod and comprising a collar bearing on the flange, a nut mounted on the threaded rod and bearing on the collar of the sleeve, and the contact surfaces between the nut and the collar of the bushing comprises serrations.

13 Claims, 3 Drawing Sheets

(51) Int. Cl.
*B60R 25/01* (2013.01)
*H01M 50/249* (2021.01)

(56) References Cited

U.S. PATENT DOCUMENTS

| | | | | |
|---|---|---|---|---|
| 2,791,898 | A * | 5/1957 | Pegg | H01M 50/264 |
| | | | | 180/68.5 |
| 2,833,363 | A * | 5/1958 | Henehan | H01M 50/202 |
| | | | | 180/68.5 |
| 2,849,074 | A * | 8/1958 | Key | H01M 50/202 |
| | | | | 180/68.5 |
| 3,498,400 | A * | 3/1970 | Hysmith | B60R 16/04 |
| | | | | 180/68.5 |
| 3,826,115 | A * | 7/1974 | Davis | B60R 16/04 |
| | | | | 180/68.5 |
| 4,038,843 | A * | 8/1977 | Daley, Jr. | B60R 11/0211 |
| | | | | 248/552 |
| 4,129,194 | A * | 12/1978 | Hammond | H01M 50/204 |
| | | | | 180/68.5 |
| 4,191,034 | A * | 3/1980 | Froess | B60R 16/04 |
| | | | | 180/68.5 |
| 4,249,403 | A * | 2/1981 | Littlejohn | B60R 16/04 |
| | | | | 70/230 |
| 4,520,887 | A * | 6/1985 | DiFazio | B60R 16/04 |
| | | | | 180/68.5 |
| 4,535,863 | A * | 8/1985 | Becker | B60R 16/04 |
| | | | | 180/68.5 |
| 4,754,827 | A * | 7/1988 | Hirabayashi | B60R 16/04 |
| | | | | 180/68.5 |
| 4,926,953 | A * | 5/1990 | Platt | B60R 16/04 |
| | | | | 180/68.5 |
| 5,052,198 | A * | 10/1991 | Watts | B60R 16/04 |
| | | | | 180/68.5 |
| 5,377,947 | A * | 1/1995 | Johnson | H01M 50/264 |
| | | | | 180/68.5 |
| 5,409,338 | A * | 4/1995 | McKinlay | F16B 39/282 |
| | | | | 411/536 |
| 7,014,002 | B2 * | 3/2006 | Mizuta | B60R 16/04 |
| | | | | 180/68.5 |
| 9,540,849 | B2 * | 1/2017 | Renfro | E05B 73/00 |
| 2013/0243544 | A1 * | 9/2013 | Delcher | F16B 39/282 |
| | | | | 411/154 |
| 2015/0089981 | A1 * | 4/2015 | Renfro | H01M 50/278 |
| | | | | 70/164 |
| 2015/0303440 | A1 * | 10/2015 | Cho | H01M 50/561 |
| | | | | 429/61 |

FOREIGN PATENT DOCUMENTS

| | | | | |
|---|---|---|---|---|
| CN | 2559823 | Y * | 7/2003 | |
| CN | 102705344 | A * | 10/2012 | |
| CN | 103531922 | A * | 1/2014 | |
| CN | 103560340 | A * | 2/2014 | |
| CN | 104454912 | A * | 3/2015 | |
| CN | 106274760 | A * | 1/2017 | B60R 16/04 |
| CN | 106763092 | A * | 5/2017 | |
| CN | 109461851 | A * | 3/2019 | B60K 1/04 |
| DE | 102015204724 | A1 * | 9/2016 | B60K 1/04 |
| DE | 102016015024 | A1 * | 7/2017 | |
| FR | 2968370 | A1 * | 6/2012 | F16B 33/002 |
| JP | H0872559 | A * | 3/1996 | |
| KR | 20100048444 | A * | 5/2010 | |
| KR | 20180131038 | A | 12/2018 | |
| WO | WO-2007063234 | A1 * | 6/2007 | B60L 50/64 |

OTHER PUBLICATIONS

Translated CN-104454912-A (Year: 2024).*
European Search Report for European Patent Application No. 21194163.8, completed Jan. 25, 2022, 3 pages.

* cited by examiner

MOTOR VEHICLE BATTERY SUPPORT

RELATED APPLICATIONS

The present application claims priority to European Patent Application No. 21194163.8, filed on Aug. 31, 2021, and entitled "MOTOR VEHICLE BATTERY SUPPORT," which is incorporated herein by reference in its entirety.

TECHNICAL FIELD

The invention relates to a motor vehicle battery support and more particularly to the device for clamping the battery on the battery support according to the invention. The invention also relates to an anti-theft device fitted to the battery support to prevent theft of the battery or batteries mounted on the holder according to the invention.

The invention can be applied in heavy-duty vehicles, such as trucks, buses, and construction equipment. Although the invention will be described with respect to an X, the invention is not restricted to this vehicle. The invention is also applicable on working machines within the fields of industrial construction machines or construction equipment, in particular wheel loaders.

BACKGROUND

According to the known prior art, for example from US20150089981, a vehicle battery support comprises a tray on which the battery is placed, and a flange used to hold the battery on the holder. The flange generally rests on the top or on a corner of the battery. The battery is held on the support by a threaded rod/nut system that clamps the flange on the battery. This system has several drawbacks. First of all, if the flange is tightened too much on the battery it will deform under the tightening action. Also, if the clamp is not tight enough, the battery will have some play and cause the clamp to loosen or even come off and the battery may fall. Even if the flange is tightened to the optimum on the battery at the time of installation, the vibrations caused by the movement of the vehicle will cause the nut to loosen and consequently the flange to loosen, which will generate noise or a movement of the battery on its support.

SUMMARY

The object of the invention is therefore to provide a battery support comprising a device for clamping the battery to the holder ensuring optimum retention of the battery over time without deterioration thereof.

The object is achieved by a battery support for a motor vehicle comprising a tray for receiving at least one battery, a device for holding the battery or batteries on the tray, the holding device comprising a flange on a threaded rod and a device for clamping the flange on the battery or batteries, the clamping device comprising a sleeve slidably mounted on the threaded rod and comprising a collar that bears on the flange, a nut mounted on the threaded rod and bearing on the collar of the sleeve the contact surfaces between the nut and the collar of the sleeve comprises serrations.

According to one embodiment, the contact surface between the collar and the flange comprises serrations. Serrations made on contact surface ensure positive lock and ensure preload is maintained even under induced road vibrations. Due to this geometrical locking (and not friction locking), the clamp load remains as is after initial settlement.

According to a further embodiment, the serrations are shaped as gear teeth and are formed by a flap inclined with respect to the contact surface and a flap substantially perpendicular to the contact surface.

According to a further embodiment, the angle of the inclined plane of the gear teeth is strictly greater than angle of the thread of the threaded rod.

According to a further embodiment, the threaded rod is mounted substantially perpendicular to the plate.

According to a further embodiment, the flange is substantially parallel to the plate.

According to a further embodiment, the threaded rod comprises a stop configured to engage the sleeve.

According to a further embodiment, the tray comprises side walls.

According to a further embodiment, the cross-section of the flange is U-shaped.

According to a further embodiment, the battery support comprises two flanges and an anti-theft device ensuring the connection and locking of the two flanges to at least two threaded rods.

According to a further embodiment anti-theft device comprises a bar, each end of the bar being mounted on a flange via the clamping device so that the collar of the sleeve comes to rest on the bar.

According to a further embodiment, the anti-theft device comprises a rod, each end of which being mounted on the threaded rods, the rod comprising a portion forming an arch, the bar comprising a slot arranged to receive the arch-shaped portion of the rod.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
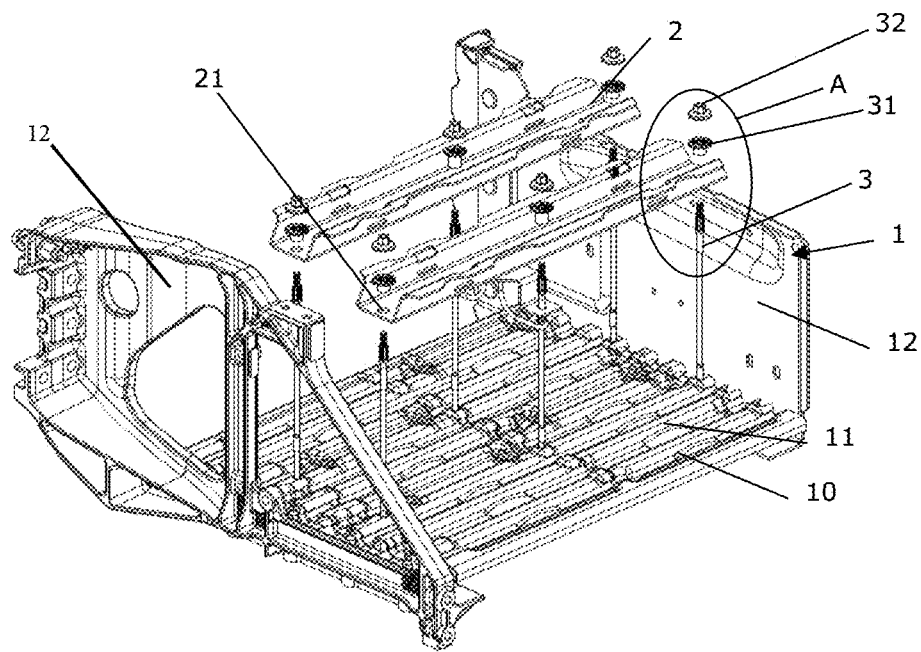
FIG. 1 represents an exploded perspective view of the battery support according to the invention.

With reference to FIG. 1, the battery support 1 according to the invention includes a tray 10 for receiving one or more batteries. The tray 10 is substantially horizontal. The tray 10 comprises, for example, an anti-slip surface 11 to ensure the stability of the battery. According to the embodiment shown, the non-slip surface 11 comprises grooves or embossments.

The battery support 1 also comprises at least two side walls 12 mounted on two opposite sides of the tray 10. The side walls 12 are substantially perpendicular to the tray 10. The side walls 12 may include means for attaching the battery support to the vehicle chassis.

The battery or batteries placed on the tray 10 are held on the battery support 1 by a holding device. The holding device comprises a flange 2 and at least one rod 3, a first end of which is threaded. The flange 2 comprises a hole 21 for the passage of the first end of the rod 3. The second end of the rod 3 is mounted on the tray 10 of the battery support 1. The mounting of the rod 3 on the plate 11 is for example done by screwing. The flange 2 is held in place on the upper side of the battery or batteries by means of a clamping device 31, 32 mounted on the thread of the rod 3.

Figure 2:
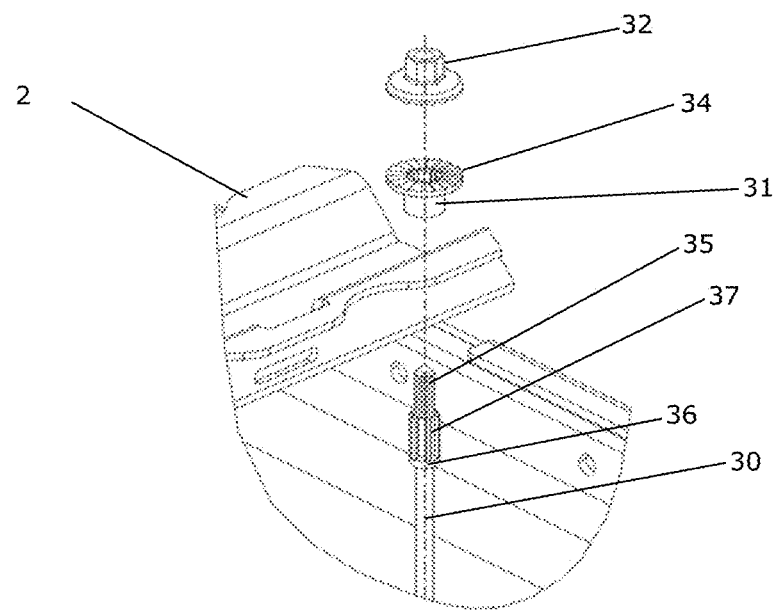
FIG. 2 represents a detail view A of FIG. 1, corresponding to a battery clamping device according to the invention

The clamping device is shown in detail in FIG. 2 and comprises a sleeve 31 and a nut 32. The sleeve 31 comprises a collar 34. During assembly, the sleeve 31 is inserted onto the first end of the rod 3 so that the collar 34 of the sleeve 31 comes to rest on the flange 2. To do this, the dimensions of the hole 21 in the flange are at least slightly larger than the diameter of the sleeve 31 and strictly smaller than the diameter of the collar 34 of the sleeve 31. The nut 32 is then screwed onto the first end of the rod 3 until it comes into contact with the collar 34 of the sleeve 31. According to the invention, the surface of the nut 32 in contact with the collar 34 of the sleeve 31 comprises serrations. Similarly, the surface of the collar 34 of the sleeve 31 in contact with the nut during assembly includes serrations.

The serrations of the nut 32 and the collar 34 are shaped to engage each other. According to the embodiment shown, the serrations are shaped as gear teeth and are formed with a flank inclined with respect to the contact surface and a flank substantially perpendicular to the contact surface. Thus, at the end of tightening of the nut 32, the engagement of the teeth of the nut 32 and the collar 34 during assembly reduces the risk of loosening due to vibrations of the battery support 1. According to one variant, the angle of the inclined flank of the teeth is strictly greater than the angle of the thread of the threaded rod 3.

According to the illustrated embodiment, the contact surface of the collar 34 of the sleeve 31 with the flange 2 comprises serrations. These serrations prevent the sleeve 31 from sliding on the contact surface of the flange 2 and thus limits overtightening of the nut 32 on the flange 2. In addition, the hole of the sleeve 31 may include a groove shaped to slide on grooves 37 formed on the rod 3. The grooves 37 are formed on a portion of the shaft 30 beyond the thread 35. When the sleeve 31 is mounted on the rod 3, the groove of the sleeve 31 is engaged in the grooves of the rod 3 which prevents rotation of the sleeve 31 relative to the rod 3. The rod 3 may also include a shoulder 36 intended to form a stop for the sleeve 31 when the sleeve 31 is mounted on the rod 3.

Figure 3:
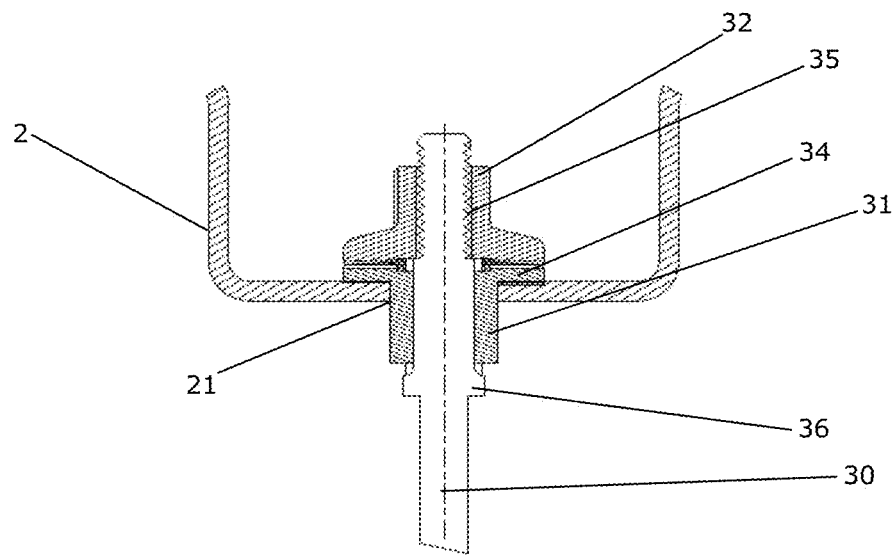
FIG. 3 represents a longitudinal sectional view of the battery clamping device according to the invention

More specifically, FIG. 3 shows the relative position of the flange 2, the rod 3, the nut 32, and the sleeve 31 when the flange 2 is mounted on a battery 4 that is placed on the battery support. When the battery 4 is mounted on the rack, the flange 2 is mounted on at least one rod 3 through the hole in the flange 2. The sleeve 31 is then mounted on the rod 3. The spline of the sleeve 31 slides over the grooves 37 of the rod 3. When present, the shoulder 36 holds the sleeve 31 onto the threaded rod 3.

The nut 32 is then screwed onto the thread 35 of the rod 3 until it comes into contact with the teeth of the flange 34 of the sleeve 31. The engagement of the teeth of the nut 32 with the teeth of the sleeve 31 forms a mechanical stop ensuring optimal tightening of the flange 2 on the battery and reducing the risk of loosening of the nut 32.

Figure 4:
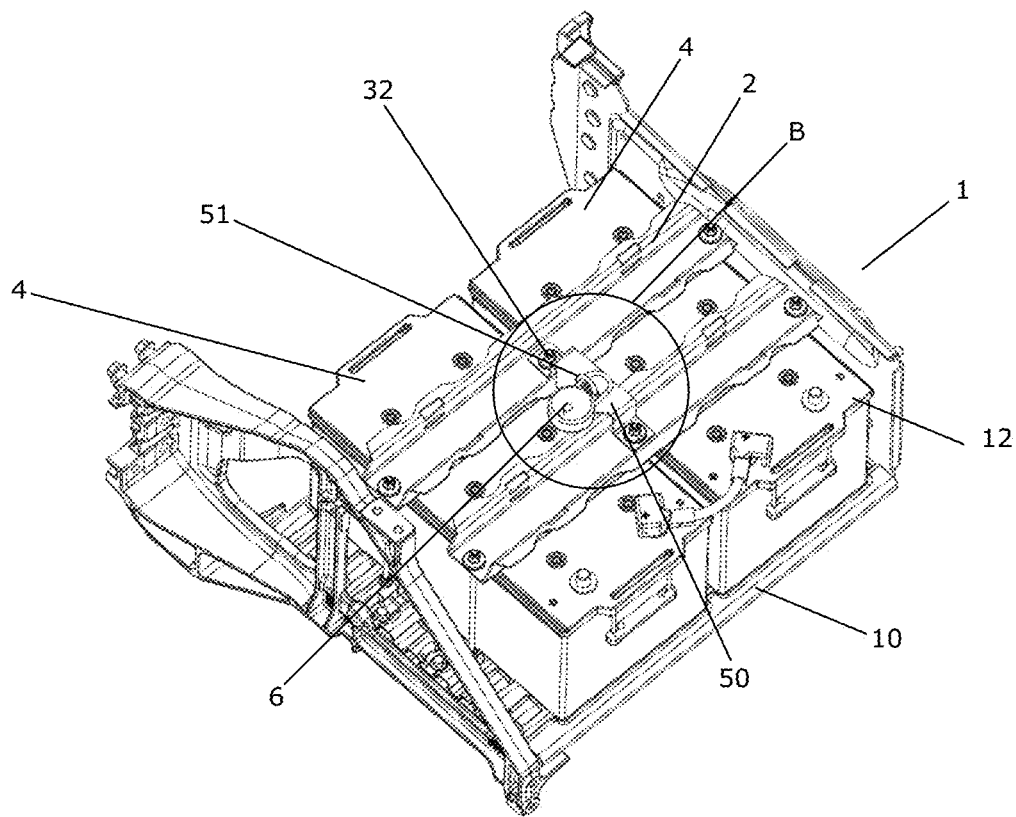
FIG. 4 represents a perspective view of the battery support according to the invention equipped with an anti-theft device FIG. 5
Figure 5:
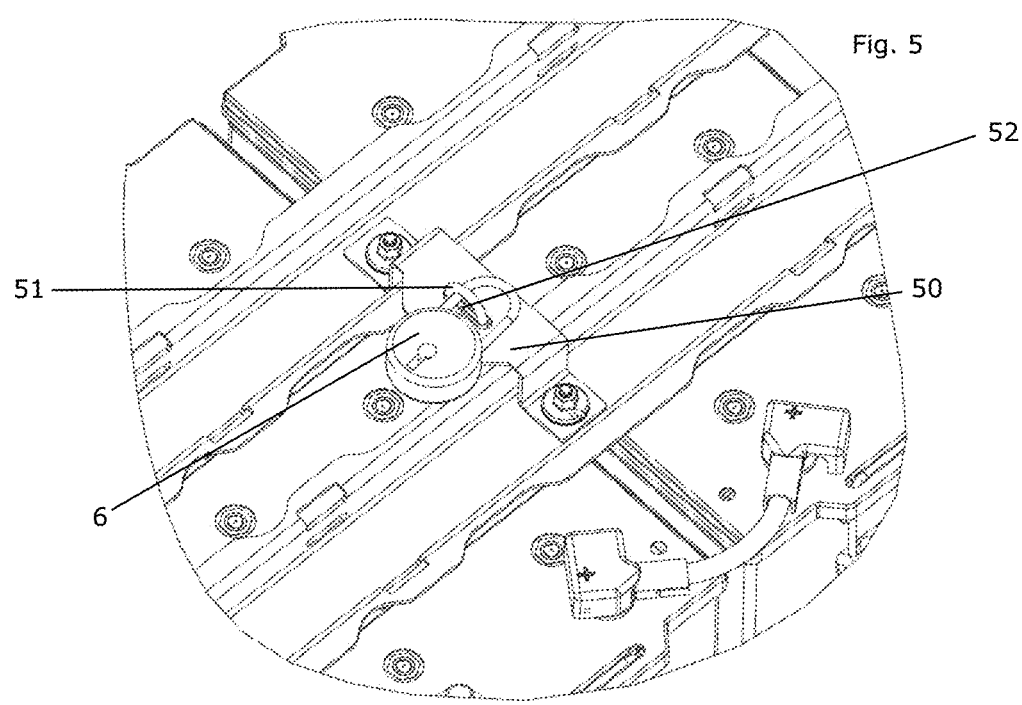
Figure 6:
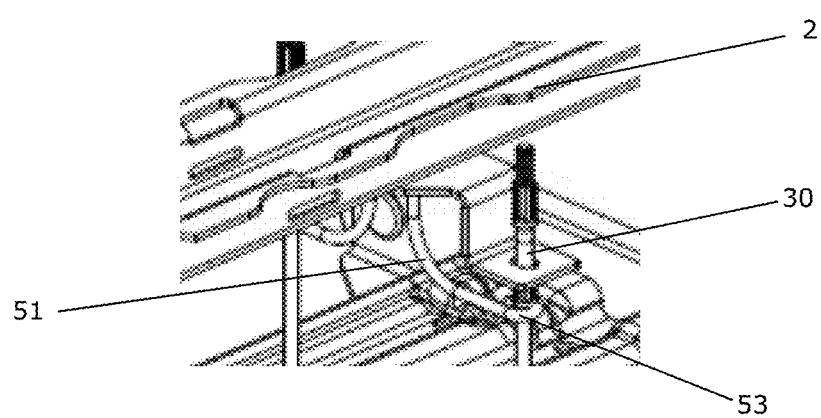
FIG. 6 represents a detail view of the anti-theft device

According to the embodiment shown in FIGS. 4, 5 and 6, the battery support according to the invention also comprises an anti-theft device 50, 51. This anti-theft device is intended to prevent the removal of the flanges 2 holding the battery or batteries 4 on the tray 10 of the battery support.

The anti-theft device comprises, for example, a bar 50 ensuring the connection between at least two flanges 2. The bar 50 of the anti-theft device is, for example, fixed to the flanges 2 via the nuts 32 of the clamping device. The bar 50 can also be fixed by other means which prevent it from being dismantled with conventional tools. Thus, the nuts 32 of the device can be replaced by nuts having a specific shape incompatible with usual tools and requiring a specific tool for disassembly.

In order to prevent the removal of the bar 50, the bar 50 includes a slot 52 allowing the passage of an arch (or loop) of a rod 51. When a lock 6 (e.g., a padlock) is attached in the rod 51 it is no longer possible to remove the bar 50 from the anti-theft device. The rod 51 has two ends 53 each of which is mounted on a threaded rod 3 of the battery support 1. For this purpose, each end of the rod 51 may comprise a ring into which the threaded rod 3 is slid.

When mounting the anti-theft device, the rod 51 is mounted on two adjacent threaded rods 3 before the nuts 32 are placed on the threaded rods 3. The flanges 2 are then inserted onto the threaded rods 3. The bar 50 is then placed on the two adjacent threaded rods 3 to connect two adjacent flanges 2. The arch of the rod 51 is inserted into the slot 52 of the bar 50. The sleeves 31 of the locking device are then mounted on the threaded rods 3 so that the bar 50 is gripped between the flange 2 and a sleeve 31. The nuts 32 are then screwed onto the threaded rods 3. The lock 6 can then be attached to the rod arch 51.

It is to be understood that the present invention is not limited to the embodiments described above and illustrated in the drawings; rather, the skilled person will recognize that many changes and modifications may be made within the scope of the appended claims.

The invention claimed is:

1. A battery support for a motor vehicle comprising:
a tray for receiving at least one battery,
a holding device for holding the at least one battery on the tray, the holding device comprising:
at least one threaded rod, each threaded rod of the at least one threaded rod receiving a flange thereon, and
a clamping device for securing the flange on the at least one battery,
wherein the clamping device comprises:
a sleeve slidably mounted on the at least one threaded rod, and the sleeve comprising a collar that bears on the flange received on the at least one threaded rod, and
a nut mounted on the at least one threaded rod and bearing on the collar of the sleeve,
wherein contact surfaces between the nut and the collar of the sleeve comprise serrations.

2. The battery support of claim 1, wherein contact surfaces between the collar and the flange comprise serrations.

3. The battery support of claim 2, wherein the serrations are shaped as gear teeth and are formed by a flank inclined with respect to the contact surface and a flank substantially perpendicular to the contact surface.

4. The battery support of claim 3, wherein an angle of an inclined plane of the serrations shaped as gear teeth is strictly greater than an angle of a thread of the at least one threaded rod.

5. The battery support of claim 1, wherein the at least one threaded rod is mounted substantially perpendicular to a plate.

6. The battery support of claim 5, wherein the flange received on the at least one threaded rod is substantially parallel to the plate.

7. The battery support of claim 1, wherein the at least one threaded rod comprises a stop configured to engage the sleeve.

8. The battery support of claim 1, wherein the tray comprises side walls.

9. The battery support of claim 1, wherein a cross-section of the flange received on the at least one threaded rod is U-shaped.

10. The battery support of claim 1, wherein the at least one threaded rod comprises two threaded rods collectively receiving two flanges, the battery support further comprising an anti-theft device ensuring connection and locking of the two flanges to the two threaded rods.

11. The battery support of claim 10, wherein the anti-theft device comprises a bar, each end of the bar being mounted on a flange of the two flanges via the clamping device so that the collar of the sleeve rests on the bar.

12. The battery support of claim 11, wherein the anti-theft device further comprises:
- a rod, each end of the rod being mounted on the two threaded rods,
- wherein the rod comprises a portion forming an arch, and the bar comprises a slot arranged to receive the arch-shaped portion of the rod.

13. A motor vehicle including the battery support of claim 1.

* * * * *